US012732039B2

(12) United States Patent
Vollmer et al.

(10) Patent No.: US 12,732,039 B2
(45) Date of Patent: Sep. 8, 2026

(54) DYNAMOELECTRIC ROTARY MACHINE

(71) Applicant: Siemens Aktiengesellschaft, Munich (DE)

(72) Inventors: Rolf Vollmer, Gersfeld (DE); Reiner Seufert, Salz (DE)

(73) Assignee: Siemens Aktiengesellschaft, Munich (DE)

( * ) Notice: Subject to any disclaimer, the term of this patent is extended or adjusted under 35 U.S.C. 154(b) by 224 days.

(21) Appl. No.: 18/728,626

(22) PCT Filed: Jan. 18, 2023

(86) PCT No.: PCT/EP2023/051048
§ 371 (c)(1),
(2) Date: Jul. 12, 2024

(87) PCT Pub. No.: WO2023/143972
PCT Pub. Date: Aug. 3, 2023

(65) Prior Publication Data

US 2025/0105687 A1 Mar. 27, 2025

(30) Foreign Application Priority Data

Jan. 28, 2022 (EP) .................................... 22154011

(51) Int. Cl.
*H02K 1/27* (2022.01)
*H02K 1/02* (2006.01)
(Continued)

(52) U.S. Cl.
CPC ............. *H02K 1/2773* (2013.01); *H02K 1/02* (2013.01); *H02K 15/03* (2013.01); *H02K 21/14* (2013.01)

(58) Field of Classification Search
CPC .......... H02K 1/2773; H02K 1/02; H02K 1/27; H02K 1/2706; H02K 1/2713; H02K 1/272;
(Continued)

(56) References Cited

U.S. PATENT DOCUMENTS 3,189,769 A * 6/1965 Willyoung ............. H02K 9/225 310/52
3,462,625 A * 8/1969 Endress ................... H02K 1/32 310/61
(Continued)

FOREIGN PATENT DOCUMENTS

DE 25 38 320 A1 3/1976
EP 2 793 366 B1 3/2016
EP 3 595 136 A1 1/2020

OTHER PUBLICATIONS

PCT International Search Report and Written Opinion of International Searching Authority mailed on Mar. 9, 2023 corresponding to PCT International Application No. PCT/EP2023/051048 filed on Jan. 18, 2023.

*Primary Examiner* — Maged M Almawri
(74) *Attorney, Agent, or Firm* — Henry M. Feiereisen LLC

(57) ABSTRACT

A dynamoelectric rotary machine includes a stator with a stator winding and a rotor. The rotor includes an at least substantially cylindrical recess for receiving a shaft. The rotor includes a first material and a second material, wherein a region of the rotor in which a d-axis flux path of a magnetic flux lies is formed of the first material. The flux path caused by a magnetic stator field that can be generated by the stator winding, wherein a region of the rotor in which a q-axis flux path of the magnetic flux lies is formed of the second material.

14 Claims, 8 Drawing Sheets

(51) Int. Cl.
*H02K 1/276* (2022.01)
*H02K 15/03* (2006.01)
*H02K 21/14* (2006.01)

(58) Field of Classification Search
CPC .... H02K 1/1726; H02K 1/2733; H02K 1/274; H02K 1/2746; H02K 1/276; H02K 1/2766; H02K 1/2753; H02K 21/12; H02K 21/14; H02K 1/24; H02K 1/28; H02K 1/32; H02K 1/325; H02K 1/265; H02K 1/26; H02K 3/527; H02K 3/52; H02K 3/34; H02K 3/345; H02K 1/00; H02K 3/18; H02K 19/02; H02K 19/16; H02K 19/38; H02K 9/22; H02K 9/02; H02K 9/19
USPC .......... 310/156.01–156.57, 52–64, 261, 417, 310/216.013, 216.004, 269
See application file for complete search history.

(56) References Cited

U.S. PATENT DOCUMENTS 3,521,094 A * 7/1970 Widder .................. H02K 9/197 310/58
4,303,842 A * 12/1981 Nathenson ............... H02K 3/22 310/201
4,315,172 A * 2/1982 Intichar .................. H02K 9/225 310/64
4,467,229 A * 8/1984 Ogita ....................... H02K 9/12 310/157
4,799,837 A * 1/1989 Vollmer .............. B23B 31/1077 279/70
5,189,325 A * 2/1993 Jarczynski ............. H02K 9/197 310/61
5,424,593 A * 6/1995 Vaghani ............... H02K 11/042 310/68 D
5,755,536 A * 5/1998 Vollmer ................ B23B 27/145 407/14
6,232,691 B1 * 5/2001 Anderson .............. H02K 29/10 310/179
6,387,294 B1 * 5/2002 Yamashita ............... H02K 1/02 252/62.55
6,429,566 B1 8/2002 Kuwahara
6,483,221 B1 * 11/2002 Pawellek ............... H02K 1/148 310/216.066
6,734,585 B2 * 5/2004 Tornquist ............... H02K 1/325 310/58
7,489,057 B2 * 2/2009 Zhou ...................... H02K 9/197 310/61
8,004,140 B2 * 8/2011 Alexander ........... H02K 1/2773 310/216.057
8,080,908 B2 * 12/2011 Matsubara .............. H02K 1/32 310/156.53
8,334,667 B2 * 12/2012 Sakai .................. H02P 21/0089 318/494
8,970,074 B2 * 3/2015 Wagner .................. H02K 7/003 310/59
10,135,319 B2 * 11/2018 Hanumalagutti ........ B60K 1/00
10,326,334 B2 * 6/2019 Larjola ................ H02K 7/1823
10,396,608 B2 * 8/2019 Gontermann ........ H02K 15/023
10,505,405 B2 * 12/2019 Tachtler ................... H02K 1/02
10,630,134 B2 * 4/2020 Goldstein .............. H02K 5/203
10,742,080 B2 * 8/2020 Hsu .......................... H02K 3/12
10,826,363 B2 * 11/2020 Huang ............... H02K 15/0407
11,476,733 B2 * 10/2022 Samie ...................... H02K 9/00
2002/0175587 A1 * 11/2002 Vollmer ................ H02K 1/146 310/179
2003/0011267 A1 * 1/2003 Vollmer ................ H02K 21/16 310/162
2003/0030333 A1 * 2/2003 Johnsen .................. H02K 1/32 310/54
2003/0094940 A1 * 5/2003 Duenisch ............. G01P 15/003 324/164
2003/0173853 A1 * 9/2003 Knauff ................ H02K 1/2773 310/152
2004/0075359 A1 * 4/2004 Muller .................. H02K 1/148 310/216.008
2004/0080218 A1 * 4/2004 Weidman ................ H02K 1/32 310/61
2004/0084989 A1 * 5/2004 Schunk ................. H02K 1/148 310/216.012
2004/0155539 A1 * 8/2004 Potoradi ............... H02K 9/225 310/58
2004/0261553 A1 * 12/2004 Bott ...................... H02K 16/00 74/25
2005/0012413 A1 * 1/2005 Bott ...................... H02K 3/522 310/71
2005/0082940 A1 * 4/2005 Knauff .................. H02K 11/25 310/260
2005/0231060 A1 * 10/2005 Vollmer ................ H02K 21/16 310/216.112
2006/0082228 A1 * 4/2006 Urbahn ................... H02K 9/20 62/50.7
2006/0219880 A1 * 10/2006 Braun ..................... F16J 15/43 250/231.13
2007/0035193 A1 * 2/2007 Huth ..................... H02K 21/46 310/156.81
2007/0040466 A1 * 2/2007 Vollmer ................ H02K 17/18 310/212
2007/0096578 A1 * 5/2007 Jahns .................... H02K 21/14 310/156.53
2007/0114861 A1 * 5/2007 Bott ...................... B65G 23/08 310/156.19
2007/0170792 A1 * 7/2007 Bott ...................... H02K 3/522 310/71
2007/0228862 A1 * 10/2007 Welchko ............. H02K 1/2766 310/156.53
2007/0257566 A1 * 11/2007 Vollmer .................. H02K 3/28 310/180
2007/0257575 A1 * 11/2007 Vollmer .................. H02K 3/28 310/156.01
2007/0284960 A1 * 12/2007 Fulton .................... H02K 1/278 310/156.01
2008/0073985 A1 * 3/2008 Bott ...................... H02K 9/227 310/58
2008/0164777 A1 * 7/2008 Braun .................... G01B 7/312 73/66
2008/0169718 A1 * 7/2008 Bott ...................... H02K 21/44 310/155
2008/0185931 A1 * 8/2008 Platen .................... H02K 17/12 310/179
2008/0197741 A1 * 8/2008 Schunk ................. H02K 21/16 310/156.01
2008/0197742 A1 * 8/2008 Vollmer .................. H02K 3/28 310/156.01
2008/0265705 A1 10/2008 Kinoshita
2008/0289440 A1 * 11/2008 Denk ..................... H02K 16/04 74/89.34
2008/0303368 A1 * 12/2008 Rahman .............. H02K 1/2766 310/156.56
2008/0315704 A1 * 12/2008 Vollmer ................ H02K 21/16 310/156.01
2009/0009114 A1 * 1/2009 Schunk ................. H02K 11/21 310/179
2009/0015080 A1 * 1/2009 Vollmer .................. H02K 3/28 310/51
2009/0039713 A1 * 2/2009 Bott ...................... H02K 7/125 310/12.09
2009/0072634 A1 * 3/2009 Vollmer ............... H02K 41/033 310/12.24
2009/0152959 A1 * 6/2009 Vollmer ................ H02K 16/00 310/112
2009/0152976 A1 * 6/2009 Bott ...................... H02K 3/493 310/214
2009/0160283 A1 * 6/2009 Bott ...................... H02K 16/00 310/156.47
2009/0184602 A1 * 7/2009 Braun .................... H02K 21/12 310/216.112

(56) References Cited

U.S. PATENT DOCUMENTS

2009/0206686 A1* 8/2009 Vollmer ................. H02K 16/04 310/12.18
2009/0212644 A1* 8/2009 Bott ..................... H02K 41/033 310/12.14
2009/0218904 A1* 9/2009 Vollmer ................... H02K 3/12 310/198
2009/0251013 A1* 10/2009 Vollmer ................. H02K 16/00 310/90
2009/0295236 A1* 12/2009 Bott ....................... H02K 7/125 310/12.14
2009/0295251 A1* 12/2009 Vollmer ................. H02K 29/03 310/195
2009/0302832 A1* 12/2009 Budde ................. B29C 45/5008 324/207.25
2009/0322174 A1* 12/2009 Grossmann ............ H02K 29/03 310/156.25
2010/0000830 A1* 1/2010 Budde ..................... F16D 49/20 188/218 XL
2010/0013332 A1* 1/2010 Vollmer .............. F16C 32/0457 310/90.5
2010/0013333 A1* 1/2010 Vollmer .............. F16C 32/0465 310/90.5
2010/0013341 A1* 1/2010 Vollmer ................... H02K 3/18 310/189
2010/0019600 A1* 1/2010 Saban .................. H02K 5/1285 310/156.28
2010/0052466 A1* 3/2010 Vollmer ................. H02K 1/278 310/216.012
2010/0079024 A1* 4/2010 Komuro ................... H02K 1/02 427/127
2010/0133940 A1* 6/2010 Grossmann .............. H02K 3/28 310/156.47
2010/0289356 A1* 11/2010 Kida ...................... H02K 11/02 310/71
2011/0006617 A1* 1/2011 Budde .................... H02K 41/02 310/12.14
2011/0080066 A1* 4/2011 Doi ........................ H02K 1/276 310/156.43
2011/0198959 A1* 8/2011 Vyas .................... H02K 1/2766 310/156.53
2012/0025654 A1* 2/2012 Bach .................... H02K 1/2781 310/156.31
2012/0038228 A1* 2/2012 Vollmer ................. H02K 41/03 310/12.21
2012/0080972 A1* 4/2012 Kanada .................... H02K 1/27 310/156.43
2012/0105930 A1* 5/2012 Yamamoto ........... G02B 26/105 310/38
2012/0146435 A1* 6/2012 Bott ....................... H02K 15/14 310/43
2012/0242182 A1* 9/2012 Yabe ...................... H02K 1/276 310/156.53
2012/0262020 A1* 10/2012 Smith .................. H02K 21/145 29/596
2012/0299408 A1* 11/2012 Higuchi ................... H02K 1/32 310/63
2013/0038151 A1* 2/2013 Ohashi ................... H02K 7/086 310/59
2013/0049910 A1* 2/2013 Tanaka .................. C22C 38/005 148/284
2013/0057117 A1* 3/2013 Suzuki ................. B60K 7/0007 310/60 R
2013/0113325 A1* 5/2013 Saito .................... H02K 1/2706 310/156.12
2013/0127264 A1* 5/2013 Fick ....................... H02K 41/03 310/12.13
2013/0127265 A1* 5/2013 Fick ......................... H02K 3/28 310/12.13
2013/0127267 A1* 5/2013 Fick ....................... H02K 41/03 310/12.18
2013/0127280 A1* 5/2013 Sugimoto ................ H02K 1/02 310/156.01
2013/0147285 A1* 6/2013 Mader .................... H02K 41/02 310/12.14
2013/0162089 A1* 6/2013 Komuro ................... H02K 1/02 310/156.01
2013/0169098 A1* 7/2013 Chamberlin ............. H02K 1/02 310/156.01
2013/0221772 A1* 8/2013 Miyamoto ............... H02K 9/19 310/54
2013/0221784 A1* 8/2013 Kori ........................ F04D 13/06 310/90
2013/0241324 A1* 9/2013 Mader ...................... H02K 1/28 310/156.43
2013/0241335 A1* 9/2013 Vollmer ............... H02K 1/2773 310/154.43
2013/0241338 A1* 9/2013 Mader ...................... H02K 1/28 29/598
2013/0241340 A1* 9/2013 Koga .................. H02K 1/2773 310/156.56
2013/0249340 A1* 9/2013 Potoradi ................ H02K 21/02 310/156.01
2013/0270949 A1* 10/2013 Gracia ..................... H02K 1/02 310/152
2013/0270956 A1* 10/2013 Yamaguchi .............. H02K 1/28 29/598
2013/0313938 A1* 11/2013 Yamada ................. H02K 16/02 310/156.69
2014/0028135 A1* 1/2014 Vollmer .................... H01F 3/02 310/90.5
2014/0042841 A1* 2/2014 Rippel ................... H02K 9/193 310/54
2014/0042857 A1* 2/2014 Mader ................. H02K 1/2773 310/156.21
2014/0054986 A1* 2/2014 Hirai ....................... H02K 9/19 310/53
2014/0070655 A1* 3/2014 Schneider ............. H02K 21/14 310/156.49
2014/0097782 A1* 4/2014 Vollmer ............. F16C 32/0463 318/504
2014/0333163 A1* 11/2014 Horii ....................... H02K 9/10 310/59
2014/0339941 A1* 11/2014 Bott .................... F16C 32/0406 310/90.5
2015/0001980 A1* 1/2015 Zhang .................... H02K 21/16 310/156.43
2015/0048697 A1* 2/2015 Vollmer ................. H02K 11/04 310/46
2015/0233421 A1* 8/2015 Bott ...................... F16C 32/048 310/90.5
2015/0280500 A1* 10/2015 Nigo ....................... F25B 31/02 310/156.53
2015/0280536 A1* 10/2015 Vollmer ................... H02K 1/02 310/54
2015/0288255 A1* 10/2015 Barker ................ H02K 1/2781 310/43
2016/0036276 A1* 2/2016 Yamagishi ............... H02K 1/22 310/59
2016/0043615 A1* 2/2016 Kayano .................. H02K 11/25 310/68 B
2016/0065014 A1* 3/2016 Bott ...................... H02K 1/278 310/156.01
2016/0065016 A1* 3/2016 Seufert .................... H02K 1/30 310/156.08
2016/0072346 A1* 3/2016 Fischer .................... H02K 1/02 310/156.12
2016/0079815 A1* 3/2016 Mader ...................... H02K 1/28 310/156.56
2016/0087494 A1* 3/2016 Fischer ................ H02K 1/2766 310/156.43
2016/0087496 A1* 3/2016 Pannier ................ H02K 1/2773 310/156.56
2016/0087501 A1* 3/2016 Mader .................... H02K 15/00 29/596
2016/0172915 A1* 6/2016 Vollmer ................. H02K 1/278 310/156.38
2016/0294229 A1* 10/2016 Volkmuth ................. F03D 9/25
2016/0301268 A1* 10/2016 Watanabe ........... H02K 1/2706

(56) References Cited

U.S. PATENT DOCUMENTS

| | | | | |
|---|---|---|---|---|
| 2017/0288476 | A1* | 10/2017 | Fischer | H02K 1/24 |
| 2018/0198331 | A1* | 7/2018 | Sano | H02K 1/276 |
| 2018/0233977 | A1* | 8/2018 | Volkmuth | H02K 9/197 |
| 2018/0262078 | A1* | 9/2018 | Huter | H02K 5/203 |
| 2019/0027984 | A1* | 1/2019 | Bott | H02K 1/2791 |
| 2019/0068012 | A1* | 2/2019 | Yazaki | H02K 1/276 |
| 2019/0207447 | A1* | 7/2019 | Swales | H02K 1/2766 |
| 2019/0267859 | A1* | 8/2019 | Kitahara | H02K 1/276 |
| 2020/0032850 | A1* | 1/2020 | Vollmer | F16D 3/04 |
| 2020/0036249 | A1* | 1/2020 | Krais | H02K 9/197 |
| 2020/0044521 | A1* | 2/2020 | Büttner | H02K 3/02 |
| 2020/0136451 | A1* | 4/2020 | Zeichfüssl | F03D 9/25 |
| 2020/0186007 | A1* | 6/2020 | Kitao | H02K 15/03 |
| 2020/0282822 | A1* | 9/2020 | Oh | H02K 7/085 |
| 2020/0366158 | A1* | 11/2020 | Morishita | B62D 5/0403 |
| 2021/0006142 | A1* | 1/2021 | Seufert | H02K 16/04 |
| 2021/0036590 | A1* | 2/2021 | Bott | H02K 5/20 |
| 2021/0126514 | A1* | 4/2021 | Vollmer | H02K 15/02 |
| 2022/0136563 | A1* | 5/2022 | Seufert | H02K 7/003 |
| | | | | 403/265 |
| 2022/0200418 | A1* | 6/2022 | Schuh | B33Y 80/00 |
| 2022/0230799 | A1* | 7/2022 | Buschbeck | H01F 17/0013 |
| 2022/0275830 | A1* | 9/2022 | Schuh | F16C 17/02 |

* cited by examiner

DYNAMOELECTRIC ROTARY MACHINE

CROSS-REFERENCES TO RELATED APPLICATIONS

This application is the U.S. National Stage of International Application No. PCT/EP2023/051048, filed Jan. 28, 2022, which designated the United States and has been published as International Publication No. WO 2023/143972 A1 and which claims the priority of European Patent Application, Serial No. 22154011.5, filed Jan. 28, 2022, pursuant to 35 U.S.C. 119(a)-(d).

BACKGROUND OF THE INVENTION

The invention relates to a dynamoelectric rotary machine.

With reluctance machines and permanently excited machines, in particular with internal magnets, it is often necessary to make compromises between rotor strength or speed stability and magnetic leakage. The speed of the machine is often limited by low rotor strength or power density and/or torque density are reduced by magnetic leakage. In most cases, the achievement of a desired speed stability is at the expense of power density or torque density.

The invention is based on the object of improving a machine in this respect.

SUMMARY OF THE INVENTION

The object is achieved by a dynamoelectric rotary machine having:

a stator with a stator winding, a rotor with an at least substantially cylindrical recess for receiving a shaft, wherein the rotor has a first material and a second material, wherein the first material is formed in a region of the rotor in which a d-axis flux path of a magnetic flux which can be brought about by a magnetic stator field that can be generated by the stator winding is located, wherein the second material is formed in a region of the rotor in which a q-axis flux path of the magnetic flux is located.

The stator field is advantageously generated by energizing the stator winding.

One embodiment is advantageous, according to which the first material is a soft magnetic material, for example, iron and/or cobalt.

Other materials, in particular materials with saturation induction of at least 2.1 T, are also possible.

The first material is used to guide the magnetic flux. The first material is advantageously arranged in the rotor in such a way that, on the one hand, it conducts the magnetic flux of the stator field in the d-axis flux direction of the rotor particularly well and, on the other hand, conducts the magnetic flux of the permanent magnets in the q-axis flux direction of the rotor particularly well.

One embodiment is advantageous, according to which the second material is a non-magnetic material, for example, non-magnetic steel, for example E316.

The second material represents high resistance for the magnetic flux.

The material is advantageously arranged in the rotor in such a way that it offers high resistance to the magnetic flux of the stator magnets in the q-axis flux direction of the rotor and reduces the magnetic leakage of the PM magnets in the rotor.

One embodiment is advantageous, according to which the rotor has a region surrounding an inner periphery of the rotor in which the second material is formed.

This enables good stability of the rotor to be achieved, in particular in a region adjacent to a shaft.

One embodiment is advantageous, according to which the rotor has a region adjacent to an outer periphery of the rotor in which the second material is formed.

This also has a positive effect on the speed stability of the rotor.

One embodiment is advantageous, according to which a region in which a third material is formed is arranged between the region surrounding the inner periphery and the region adjacent to the outer periphery.

One embodiment is advantageous, according to which the third material is a permanent magnetic material.

This embodiment is advantageous since the stator magnets can generate high reluctance torques and in addition high torques can be generated in conjunction with the permanent magnets.

This enables high torque density or power density to be achieved.

Preferably, the regions with the first material and the second material are produced by means of screen printing or stencil printing. This is achieved in particular by the method explained below. Preferably, cut-outs or recesses are provided in the rotor into which preferably prefabricated permanent magnets are inserted.

One embodiment is advantageous, according to which the third material is tangential to the region surrounding the inner periphery and the region adjacent to the outer periphery.

This arrangement is explained in more detail in the description of the figures.

The permanent magnets are securely fixed in this way. Preferably, they are additionally fixed with adhesive and/or resin.

One embodiment is advantageous, according to which the region in which a third material is formed is in the shape of a rectangle, wherein the region surrounding the inner periphery has at least a portion shaped so as to be flush with a side of the tangential rectangular region.

One embodiment is advantageous, according to which the region adjacent to the outer periphery has at least a portion shaped so as to be flush with a side of the tangential rectangular region.

This means that prefabricated permanent magnets can be used and easily pushed or pressed into the rotor.

One embodiment is advantageous, according to which two further regions are formed adjacent to the outer periphery in which the second material is formed, wherein a further region is formed between the further regions and tangential thereto in which the third material is formed.

The third material is advantageously arranged in the q-axis flux path of the rotor. The third material is preferably present in the form of permanent magnets. On the one hand these generate their own magnetic field in the q-axis, on the other, they also generate magnetic resistance to the stator field in the q-axis.

The reluctance torques are particularly high if the soft magnetic anisotropy of the rotor is high. This is advantageously achieved if the magnetic resistance is low in the d-path (for example, few air gaps or little non-magnetic material) and if there is a lot of non-magnetic material in the q-path. The magnets then act advantageously like non-magnetic material due to the low permeability.

The magnets advantageously also form torques due to their magnetic flux. For this purpose, little non-magnetic material or a sufficiently large air gap is advantageously formed in the q-path (apart from the magnets).

One embodiment is advantageous, according to which the first material and the second material are connected with a material bond.

This makes it possible to create stable individual rotor layers and thus build a fixed-speed rotor.

One embodiment is advantageous, according to which the region surrounding the inner periphery has star-shaped extensions.

This further reduces the magnetic leakage flux in the inner rotor region and also increases the strength.

The object is furthermore achieved by a rotor for a dynamoelectric rotary machine having a plurality of material layers arranged one behind the other.

The object is furthermore achieved by a method for producing such a rotor, wherein a material layer comprises at least a first region having a first material and at least a second region having a second material, wherein the material layer furthermore comprises at least one cut-out, with the following steps;

- applying a first suspension having at least a binder and solid particles through a first stencil to a base surface to obtain a first green body, wherein the first region is mapped by the first stencil,
- applying a second suspension having at least one binder and solid particles through a second stencil to a base surface to obtain a second green body, wherein the second region is mapped by the second stencil,
- joining the first green body and the second green body,
- creating a permanent material-bonded cohesion of the two green bodies and the solid particles by heating and/or by means of compaction, in particular by means of sintering, to form the material layer,
- arranging a plurality of material layers,
- inserting magnetic material, in particular prefabricated magnetic material, into the cut-out.

BRIEF DESCRIPTION OF THE DRAWING

The following describes and explains the invention in more detail with reference to exemplary embodiments depicted in the figures.

It is shown in.

DETAILED DESCRIPTION OF PREFERRED EMBODIMENTS

Figure 1:
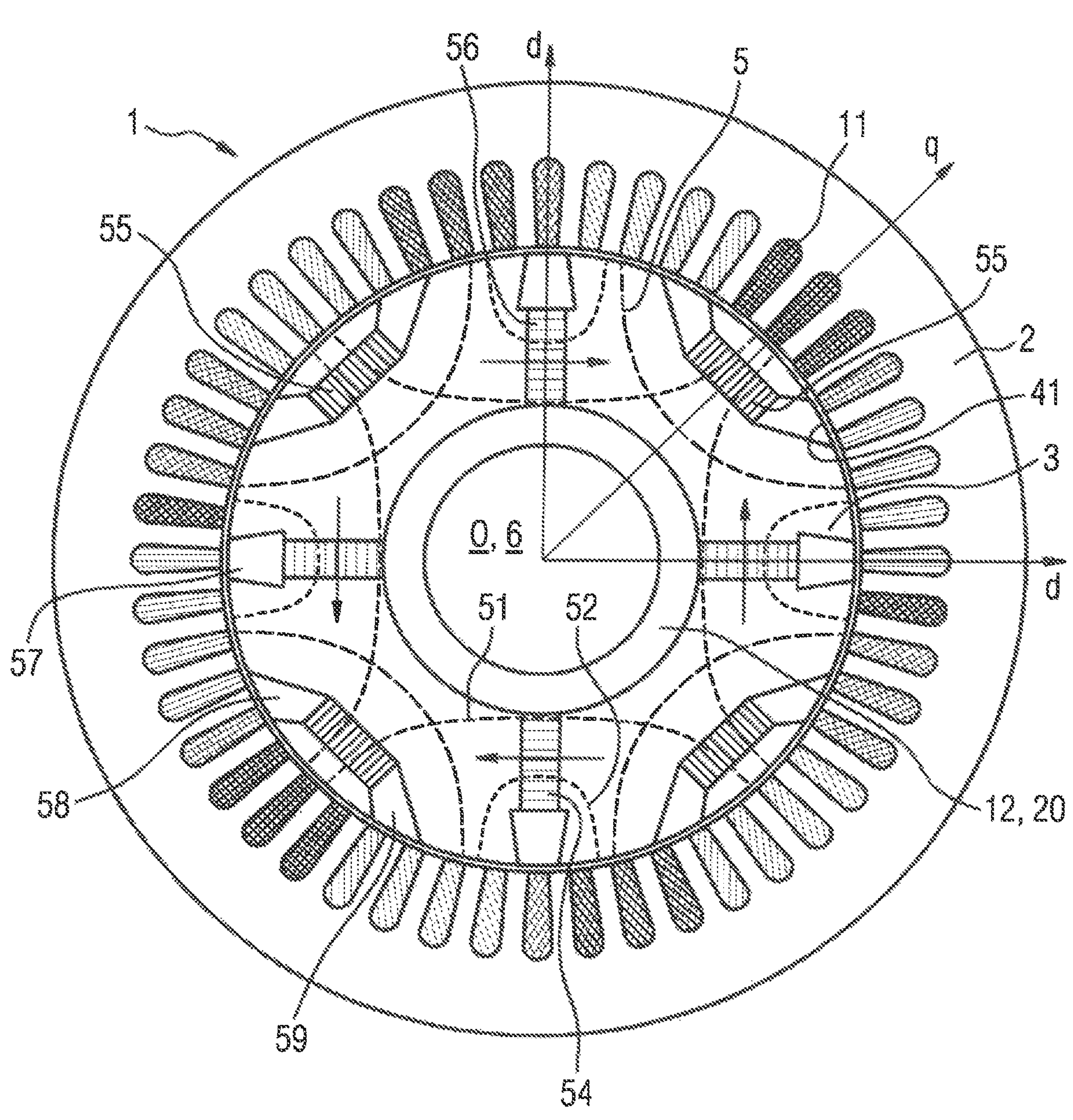
FIGS. 1, 3, 4, 5 and 9 embodiments of a dynamoelectric rotary machine, FIGS. 2, 7 and 8 embodiments of a rotor layer, FIG. 6 a method, FIG. 10 a section from FIG. 8

FIG. 1 shows a dynamoelectric rotary machine 1.

The machine 1 has a stator 2 with a stator winding 11. In addition, the machine 1 has a rotor 3. The rotor 3 has an at least substantially cylindrical recess (see reference symbol 0 in FIG. 2). The recess is embodied to receive a shaft 6. The rotor 3 has a first material 8 and a second material 9. The two materials 8, 9 (see FIG. 2) are advantageously connected to one another by a material bond.

The first material 8 is formed in a region of the rotor 3 in which a q-axis flux path 51, 52 of a magnetic flux which can be brought about by a magnetic stator field that can be generated by the stator winding 11 is located. The magnetic stator field and hence the magnetic flux are generated by energizing the stator winding 11.

The second material 9 is formed in a region of the rotor 3 in which a q-axis flux path 51, 52 of the magnetic flux is located.

Advantageously, the first material 8 is a material that facilitates the guidance of a magnetic flux. The first material 8 contains, for example, iron and/or cobalt or an alloy of iron or iron-cobalt. A saturation induction of the material of at least 1.8 T, advantageously at least 2.1 T, is advantageous.

The first material 8 is advantageously arranged in the rotor 3 in such a way that, on the one hand, it conducts the magnetic flux of the stator field in the d-axis flux path 5 of the rotor 3 particularly well and, on the other hand, conducts the magnetic flux of a permanent magnet in the q-axis flux path 51, 52 of the rotor 3 particularly well.

Advantageously, the second material 9 is non-magnetic (in particular with a saturation induction of ≤0.1 T) and represents high resistance for the magnetic flux.

Advantageously, the second material 9 has non-magnetic steel, for example, E316.

The second material 9 is advantageously arranged in the rotor 3 in such a way that it offers high resistance to the magnetic flux of the stator field in the q-axis flux path of the rotor 3 and reduces the magnetic leakage of the permanent magnets in the rotor 3.

FIG. 1 shows an inner periphery and an outer periphery of the rotor 3. A region 20 surrounding the inner periphery of the rotor 3 advantageously has the second material 9. The material is advantageously non-magnetic.

In addition, FIG. 1 shows that there are multiple regions adjacent to the outer periphery 57, 58, 59 of the rotor 3 on the outer periphery 57, 58, 59 of the rotor 3, which advantageously contain the second material 9.

In addition, FIG. 1 shows a third material in the shape of a permanent magnet 54, 55 and 56. In FIG. 1, the permanent magnet 54 is adjacent to the region 57 and the region 20. The permanent magnet 54 is tangential to the region 57 and the region 20. In FIG. 1, the permanent magnet 54 is formed in the shape of a rectangle.

The regions 57 and 20 are advantageously formed, at least in portions, in such a way that they are in each case flush with a side of the tangential rectangular permanent magnet 54. This can also be identified in the rectangular permanent magnet 55. Two regions 58 and 59 adjacent to the outer periphery 57, 58, 59 are formed in portions in such a way that they are in each case flush with a side of the rectangular permanent magnet 55.

Alternatively, the region 20 can also have a further material 12 with particularly high-tensile strength (<=500 MPa). This allows high pressures to be applied to the shaft 6 and increases the maximum permissible speeds of the machine.

The magnets in the q-axis flux path of the rotor 3 advantageously generate their own magnetic field in the q-axis. On the other hand, they also generate magnetic resistance to the stator field in the q-axis.

The high magnetic resistance advantageously means that the stator magnetic field in the q-axis can only be formed to a small extent. This advantageously results in high torque-current linearity and hence in high torques that are formed by the permanent magnetic field and stator magnetic field.

Figure 2:
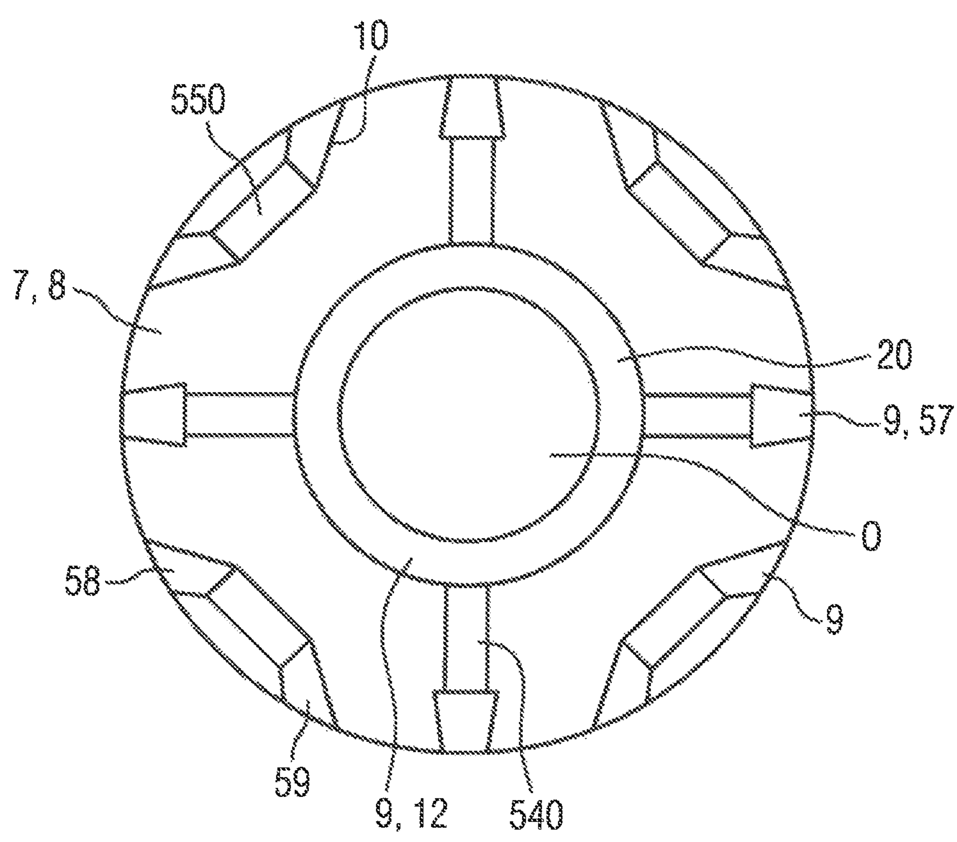

FIG. 2 shows a rotor layer 7. The rotor 3 shown in FIG. 1 advantageously has a plurality of rotor layers 7 arranged one behind the other.

FIG. 2 shows a rotor layer 7 produced from at least two materials.

The materials are advantageously connected to one another by a material bond, in particular by means of metal diffusion. The tensile strength of this connection is advantageously greater than 200 MPa at 200° C.

In addition, the rotor plate has a plurality of cut-outs. A cut-out for the shaft 6 is marked 0. In addition, cut-outs for permanent magnets are marked 540 and 550. The region surrounding the inner periphery of the rotor layer 7 can be formed as a ring or in an annular shape, as shown in FIG. 2. The region 20 has the same material as the regions 58, 59 arranged on the outer periphery. However, a further material 12 in the region 20 is also conceivable in order to increase the tensile strength. This is, for example, high-alloy steel.

The regions 58, 59 and 57 arranged on the outer periphery also increase the strength of the rotor layer 7.

Figure 6:
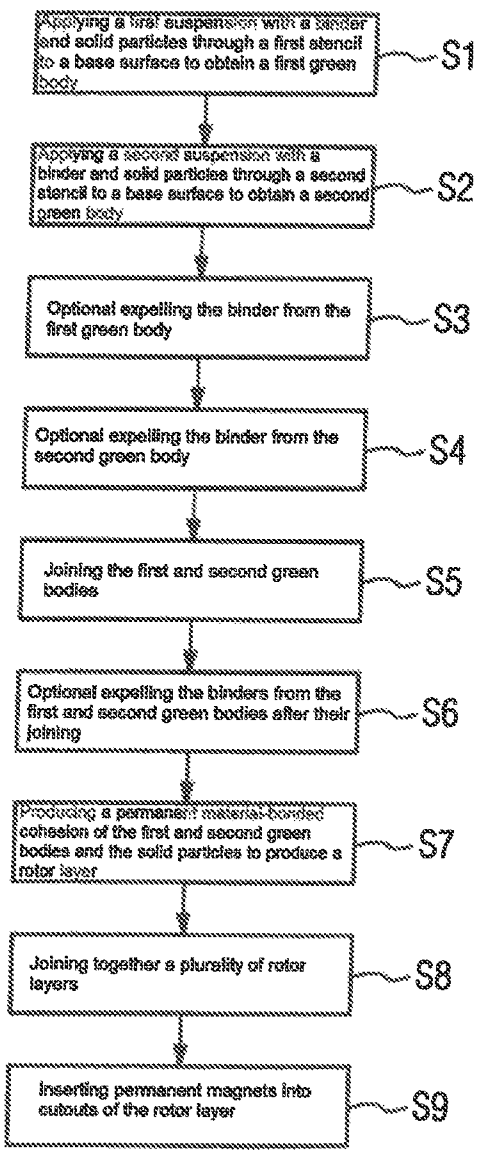

FIG. 2 shows a rotor layer 7 that can be produced by the method described in FIG. 6.

Advantageously, a plurality of these rotor layers 7 are joined together and then a prefabricated permanent magnet is inserted into the cut-outs 550, 540.

Figure 7:
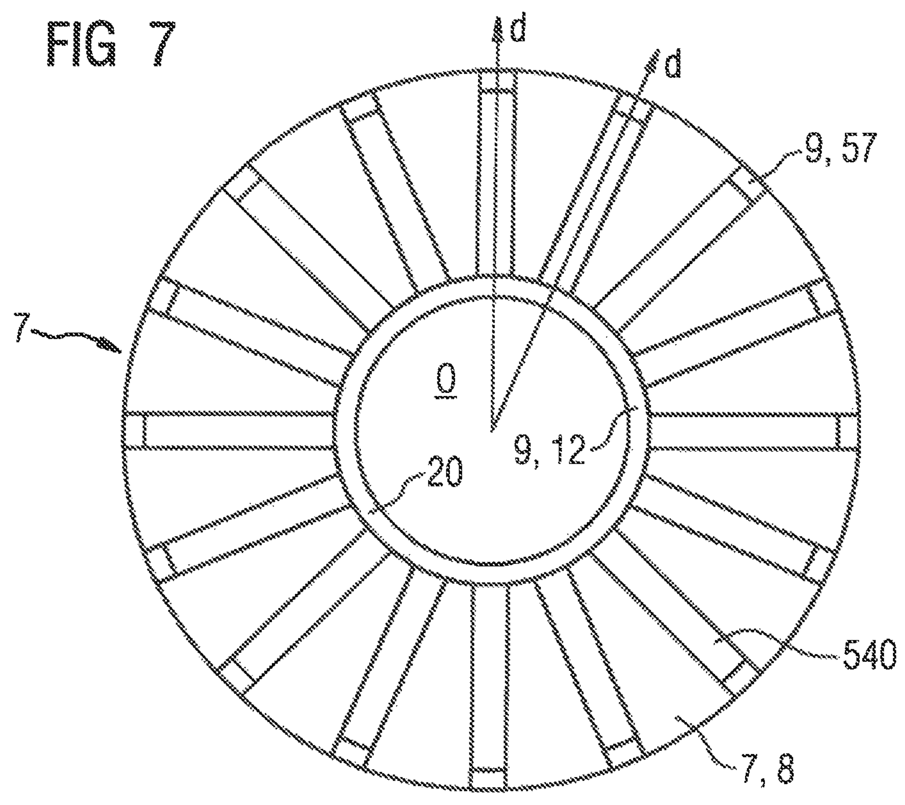
Figure 8:
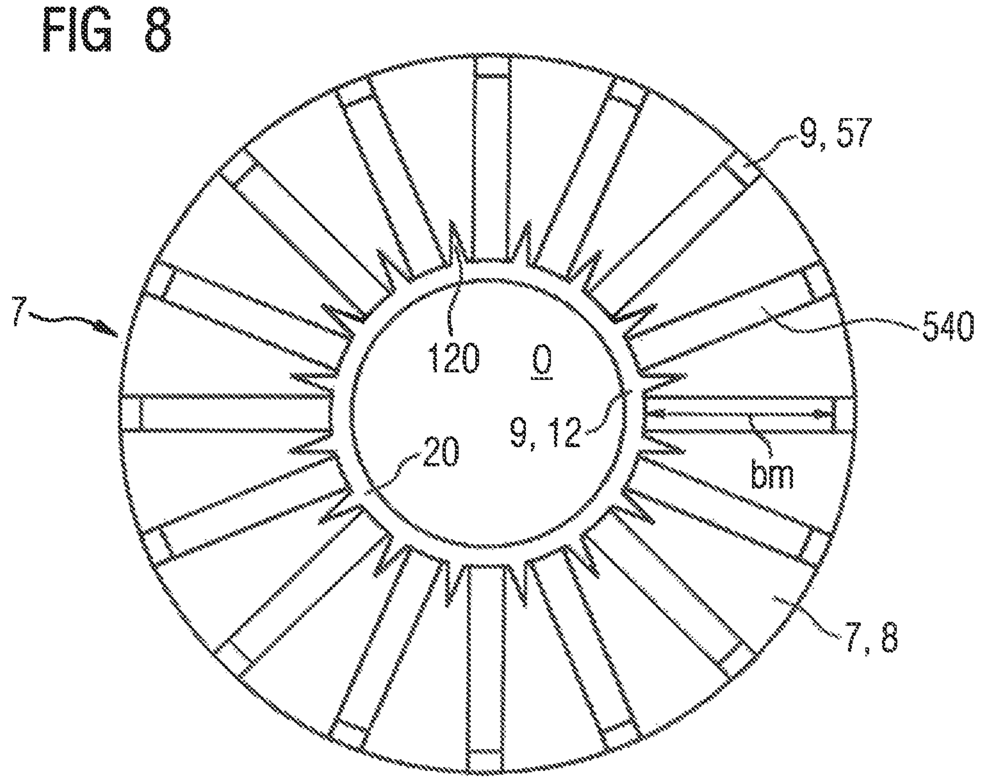

FIG. 7 and FIG. 8 show further possible embodiments of the rotor layer 7. The rotor layers 7 shown are, for example, suitable for 16-pole machines 1 (see also FIG. 9), in particular a three-phase permanently excited synchronous machine. A number of poles of p≥4 is advantageous.

FIG. 8 shows a particular embodiment. The region 20 has a plurality of star-shaped extensions 120, in particular made of a soft magnetic material.

Figure 10:
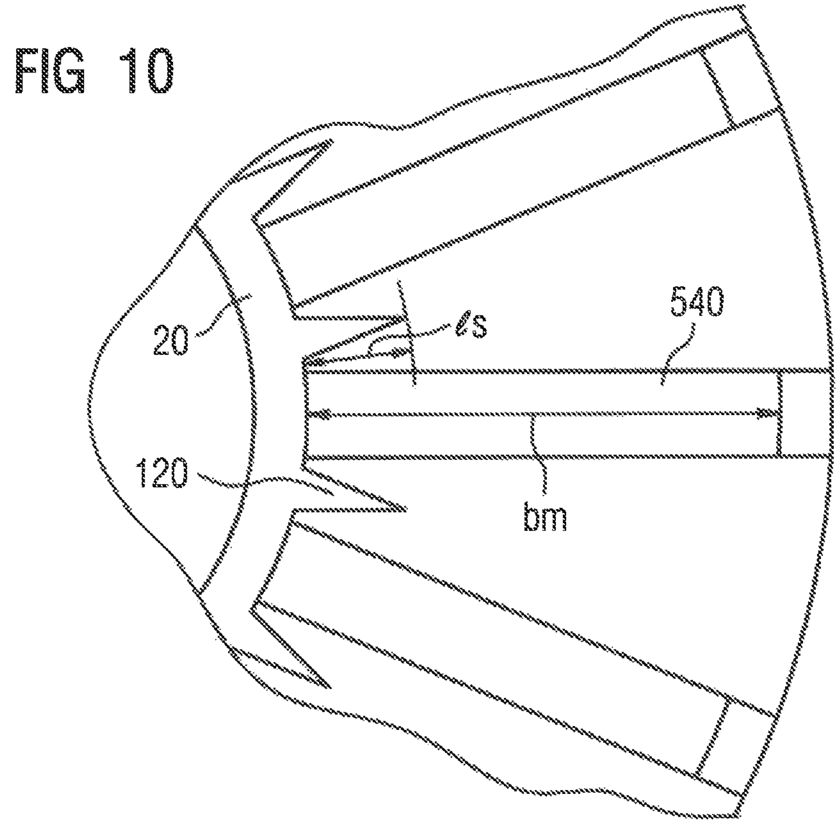

A length ls of the star-shaped extension 120 (see FIG. 10) is advantageously between 20% and 100% of bm, wherein bm describes a radial length of the cut-out 540. Advantageously, the cut-out 540 is filled with a magnet at a later time.

This can, for example, be a ferrite magnet, in particular a ceramic ferrite magnet. However, NdFeB or SmCo magnets are also conceivable.

Figure 9:
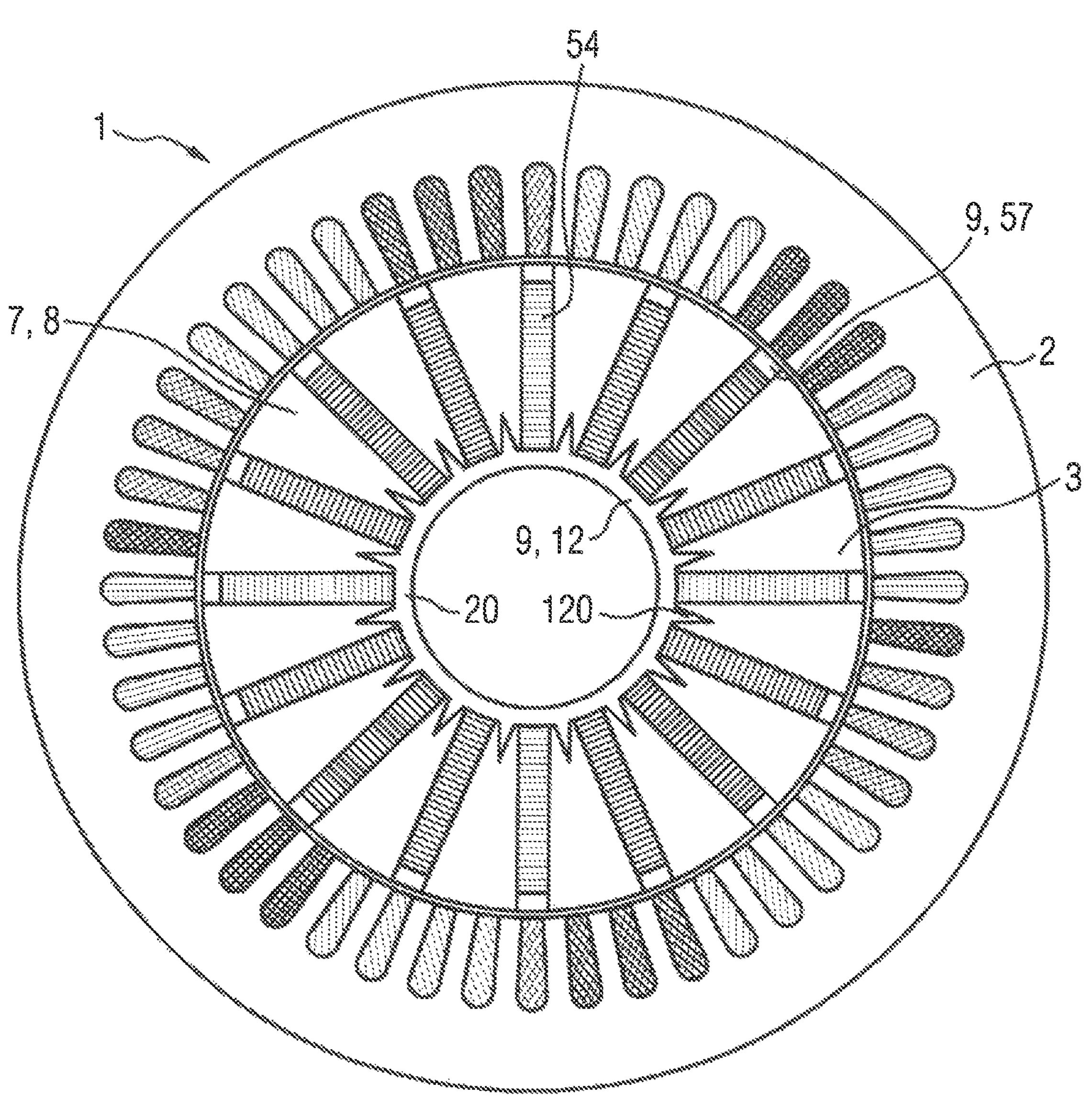

The stator 2 in FIG. 9 has a three-phase winding. The magnetic coils are preferably embodied as windings around individual teeth. The number of wound teeth preferably=18.

Advantageously, the stator has a plurality of stator layers arranged one behind the other, which have soft magnetic material, preferably with a saturation induction of at least 2.1 T.

Preferably, a stator layer is at least 50 μm and at most 200 μm thick. Preferably, the stator layer is thinner than 150 μm. The stator layer can, for example, be produced by means of a screen-printing method or a stencil-printing method.

The rotor layer 7 can also, for example, be produced by means of a screen-printing method or a stencil-printing method. Preferably, a rotor layer is at least 50 μm and at most 200 μm thick. Preferably, the rotor layer is thinner than 150 μm.

The invention offers the advantage that, due to the non-magnetic material in the rotor, the magnetic leakage flux is very low.

The embodiment shown in FIG. 9 has particular advantages: here, star-shaped tips protrude from the inner non-magnetic ring 20 into the magnetic flux conductors. This further reduces the magnetic leakage flux in the inner rotor region and in addition increases the strength.

The machine 1 has a very high level of efficiency. It is possible to achieve or even exceed energy efficiency class IE5. The advantage over conventional asynchronous and synchronous reluctance motors is particularly clear in the case of smaller machines (in particular under 20 kW).

In particular, the use of ferrite magnets means that the machine 1 has less mass and is cheaper. Ferrites also have the advantage that they are cheaper than rare earth magnets and have a lower $CO_2$ equivalent. In addition, their availability is higher.

A PM synchronous machine with ceramic ferrite magnets has particularly low losses because no eddy currents flow in the ceramic magnets. The significant reduction in the internal rotor leakage flux also reduces copper losses in the stator.

The rotor 3 depicted is robust and rigid. Hence, it has a long service life, low vibrations and low noise levels.

The machine 1, is, for example, suitable for highly efficient industrial motors, but also for electromobility.

Figure 3:
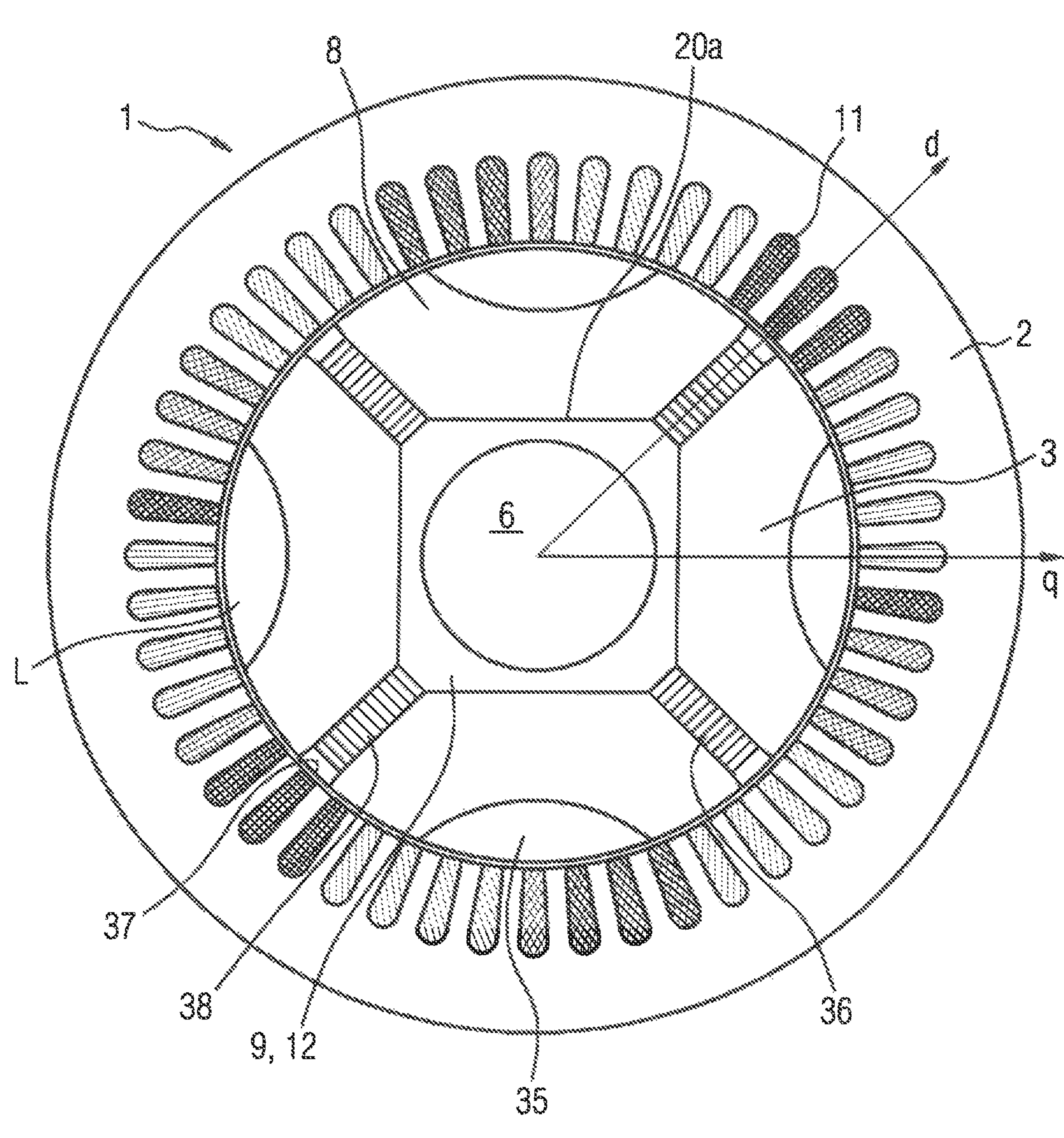

FIG. 3 shows a further embodiment of the machine 1.

The embodiment has radial magnets 38. The region **20*a* surrounding the inner periphery is also shaped differently than in the embodiments shown so far. In FIG. 3, the region 20*a* is formed as an octagon with eight sides, wherein four sides have a first length and a further four sides have a second length, wherein the second length is shorter than the first length. Two sides of equal length are arranged opposite one another in FIG. 3**.

The rotor 3 shown in this embodiment is not completely round, but has circular segment portions that are, for example, filled with air L. Alternatively, a non-magnetic material can also be inserted in this region marked with L.

The rotor 3 has regions 37 arranged on the outer periphery 57, 58, 59 which have the second material 9.

Figure 4:
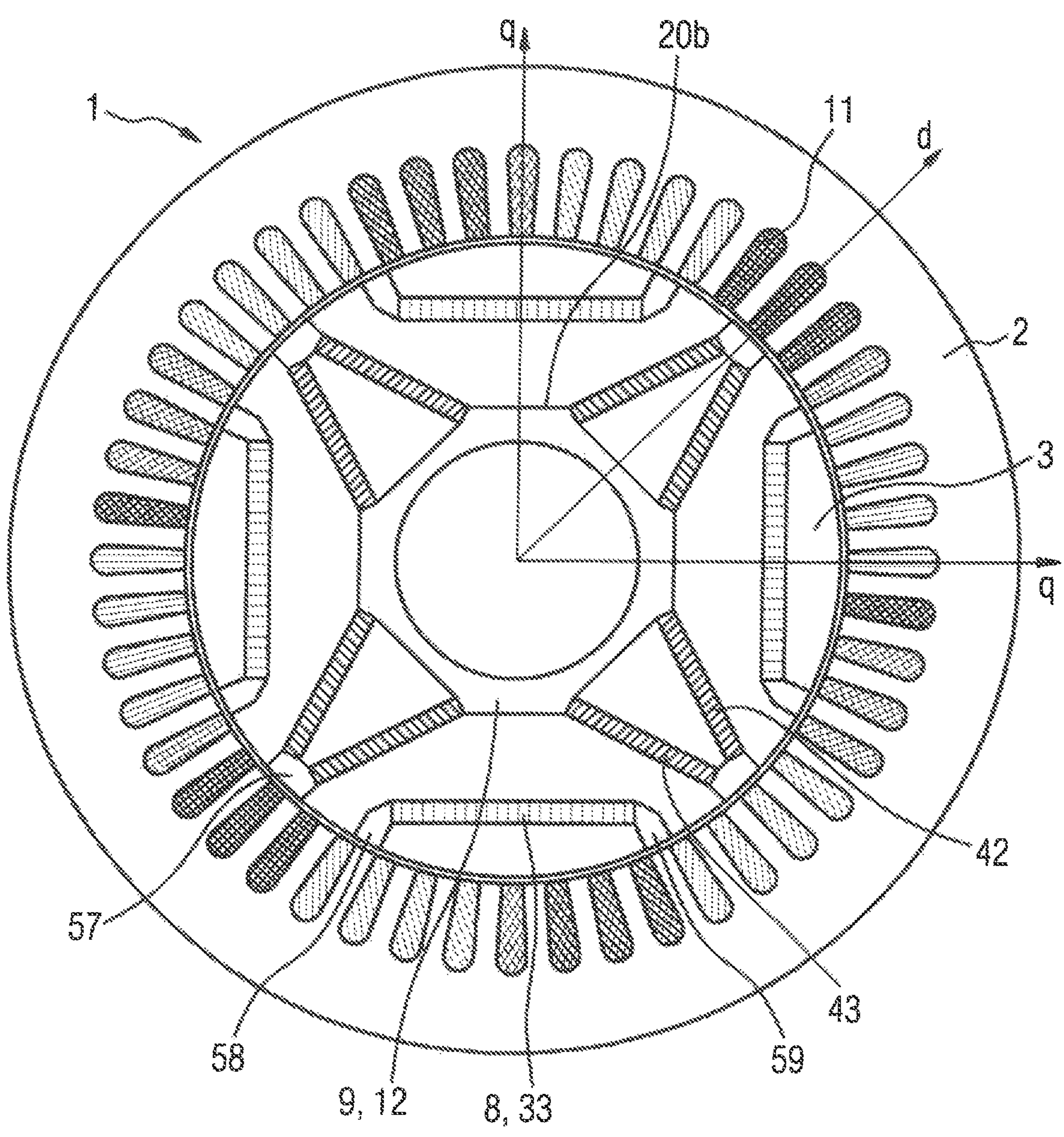

FIG. 4 shows an embodiment that has split radial magnets 42, 43. This means that one side of the magnets 42, 43 is adjacent to one region 57 and in each case the other side of the permanent magnet 42 or 43 is tangential to the region **20*b*** surrounding the inner periphery at different points.

The permanent magnets 42, 43 and 33 shown in FIG. 4 are more slimline than the magnets in FIG. 1, for example.

Figure 5:
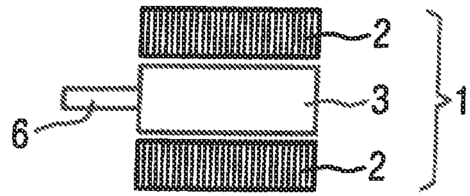

FIG. 5 shows the dynamoelectric rotary machine 1 having a stator 2, a rotor 3 and a shaft 6.

FIG. 6 shows a method for producing a rotor layer 7.

The above-described rotor 3 advantageously has a plurality of rotor layers 7 arranged one behind the other. The rotor layer 7 comprises a plurality of regions that have different materials, but at least a first material and a second material.

In method step S1, a first suspension having at least one binder and solid particles is applied through a first stencil to a base surface to obtain a first green body.

The first stencil forms the regions that have the first material.

A second stencil advantageously maps the regions that have the second material.

Accordingly, in method step S2, a second suspension having at least a binder and solid particles is applied through the second stencil to a base surface to obtain a second green body.

In an optional method step S3, the binder can be expelled from the first green body.

In an optional method step S4, the binder can be expelled from the second green body.

The binder is preferably expelled by means of debinding.

In method step S5, the two green bodies are joined together.

Alternatively or additionally, the binder can be expelled after the joining of the green bodies in method step S6.

Hence, different procedures can be followed: the respective binder from the first green body and/or the second (and/or further) green body can be expelled before the joining in method step S3 and method step S4 of the first green body and the second green body (and/or further ones) and/or after the joining (see method step S6).

In method step S7, a permanent material-bonded cohesion of the two green bodies and the solid particles is obtained by heating and/or compaction, in particular by means of sintering.

In method step S8, the rotor layers 7 are joined together.

In method step S9, permanent magnets are inserted into the cut-outs.

What is claimed is:

1. A rotor for a dynamoelectric rotary machine, the rotor comprising a rotor layer, said rotor layer comprising:

an at least substantially cylindrical recess for receiving a shaft;

a first material made of a soft magnetic material and formed in a region of the rotor in which a d-axis flux path of a magnetic flux caused by a magnetic stator field generated by a stator winding is located;

a second material made of a non-magnetic material and formed in a region of the rotor in which a q-axis flux path of the magnetic flux is located, with the first material and the second material being connected by a material bond through sintering;

a first rotor region in surrounding relation to an inner periphery of the rotor layer in which first rotor region the second material is formed;

a second rotor region adjacent to an outer periphery of the rotor layer in which second rotor region the second material is formed, with a d-axis of the dynamoelectric rotary machine running through the second rotor region;

a third rotor region arranged between the first and second rotor regions and formed in a shape of a rectangle, with the first rotor region having a portion shaped so as to be flush with a side of the tangential rectangular third rotor region, and with the second rotor region having a portion shaped so as to be flush with a side of the tangential rectangular third rotor region;

a third material made of a permanent magnetic material and arranged in the third rotor region such as to be tangential to the first and second rotor regions;

two further rotor regions adjacent to the outer periphery of the rotor layer, in which two further rotor regions the second material is formed; and an additional rotor region between the two further rotor regions and tangential thereto, in which additional rotor region the third material is formed, with a q-axis of the dynamoelectric rotary machine running through the additional region.

2. The rotor of claim 1, wherein the soft magnetic material is iron and/or cobalt.

3. The rotor of claim 1, wherein the non-magnetic material is non-magnetic steel.

4. The rotor of claim 1, wherein the non-magnetic material is E316.

5. The rotor of claim 1, wherein the first rotor region includes star-shaped extensions.

6. The rotor of claim 1, further comprising a plurality of said rotor layer arranged one behind the other.

7. A method for producing a rotor as set forth in claim 1, with the rotor including a material layer comprising a first region having a first material, a second region having a second material, and a cut-out, the method comprising:

applying a first suspension having a binder and solid particles through a first stencil to a base surface to obtain a first green body, with the first region being mapped by the first stencil;

applying a second suspension having a binder and solid particles through a second stencil to a base surface to obtain a second green body, with the second region being mapped by the second stencil;

joining the first green body and the second green body;

creating a permanent material-bonded cohesion of the first and second green bodies and the solid particles by at least one of heating, compaction, and sintering, to form the material layer;

arranging a plurality of said material layer; and inserting magnetic material into the cut-out.

8. The method of claim 7, wherein the magnetic material is prefabricated magnetic material.

9. A dynamoelectric rotary machine, comprising:

a stator comprising a stator winding generating a magnetic stator field to cause a magnetic flux; and a rotor comprising a rotor layer, said rotor layer comprising an at least substantially cylindrical recess for receiving a shaft, a first material made of a soft magnetic material and formed in a region of the rotor in which a d-axis flux path of a magnetic flux caused by a magnetic stator field generated by a stator winding is located, a second material made of a non-magnetic material and formed in a region of the rotor in which a q-axis flux path of the magnetic flux is located, with the first material and the second material being connected by a material bond through sintering, a first rotor region in surrounding relation to an inner periphery of the rotor layer in which first rotor region the second material is formed, a second rotor region adjacent to an outer periphery of the rotor layer in which second rotor region the second material is formed, with a d-axis of the dynamoelectric rotary machine running through the second rotor region, a third rotor region arranged between the first and second rotor regions and formed in a shape of a rectangle, with the first rotor region having a portion shaped so as to be flush with a side of the tangential rectangular third rotor region, and with the second rotor region having a portion shaped so as to be flush with a side of the tangential rectangular third rotor region, a third material made of a permanent magnetic material and arranged in the third rotor region such as to be tangential to the first and second rotor regions, two further rotor regions adjacent to the outer periphery of the rotor layer, in which two further rotor regions the second material is formed, and an additional rotor region between the two further rotor regions and tangential thereto, in which additional rotor region the third material is formed, with a q-axis of the dynamoelectric rotary machine running through the additional region.

10. The dynamoelectric rotary machine of claim 9, wherein the soft magnetic material is iron and/or cobalt.

11. The dynamoelectric rotary machine of claim 9, wherein the non-magnetic material is non-magnetic steel.

12. The dynamoelectric rotary machine of claim 9, wherein the non-magnetic material is E316.

13. The dynamoelectric rotary machine of claim 9, wherein the first rotor region includes star-shaped extensions.

14. The dynamoelectric rotary machine of claim 9, wherein the rotor comprises a plurality of said rotor layer arranged one behind the other.

* * * * *